United States Patent [19]

Spector

[11] 4,256,847
[45] Mar. 17, 1981

[54] RIGID POLYURETHANE FOAM PROCESS USING LITHIUM/ZINC CATALYST

[75] Inventor: Richard J. Spector, Cuyahoga Falls, Ohio

[73] Assignee: Mooney Chemicals, Inc., Cleveland, Ohio

[21] Appl. No.: 85,724

[22] Filed: Oct. 17, 1979

[51] Int. Cl.$^3$ .................... C08G 18/14; C08G 18/22
[52] U.S. Cl. ................................ 521/117; 521/125
[58] Field of Search ............................ 521/125, 117

[56] References Cited

U.S. PATENT DOCUMENTS

| | | | |
|---|---|---|---|
| 2,894,919 | 7/1959 | Simon et al. | 521/157 |
| 3,041,295 | 6/1962 | Wiech et al. | 521/107 |
| 3,108,975 | 10/1963 | Lambert et al. | 521/110 |
| 3,347,804 | 10/1967 | Buckley | 521/124 |
| 3,476,933 | 11/1969 | Mendelsohn | 521/127 |
| 3,580,873 | 5/1971 | Bianca | 521/124 |
| 3,634,345 | 1/1972 | Diehr et al. | 521/117 |
| 3,723,367 | 3/1973 | Chow et al. | 521/125 |
| 3,751,392 | 8/1973 | Olstowski | 521/123 |
| 3,884,849 | 5/1975 | Molbert | 521/124 |
| 3,940,517 | 2/1976 | DeLeon | 521/118 |
| 4,053,439 | 10/1977 | Chlystek | 521/119 |
| 4,107,069 | 8/1978 | Keller et al. | 521/93 |

FOREIGN PATENT DOCUMENTS 980139  1/1965  United Kingdom ............... 521/125

*Primary Examiner*—H. S. Cockeram

[57] ABSTRACT

A rigid polyurethane foam prepared from a foamable mixture consisting essentially of
 (a) an organic polyisocyanate,
 (b) an organic polyol,
 (c) a blowing agent, and
 (d) a catalyst consisting of a mixture of lithium and zinc salts of aliphatic or alicyclic organic monocarboxylic acids or mixtures of acids is described. The lithium and zinc salts exhibit excellent catalytic activity in a wide range of rigid foam systems with no deleterious effects on the physical properties of the foam.

9 Claims, No Drawings

RIGID POLYURETHANE FOAM PROCESS USING LITHIUM/ZINC CATALYST

BACKGROUND OF THE INVENTION

The present invention relates to rigid polyurethane foam compositions, and more particularly, to rigid polyurethane foam compositions prepared with a mixture of lithium and zinc salts as catalysts.

The production of rigid polyurethane foams is a well known art, and such foams have a wide variety of industrial and commercial applications. Rigid polyurethane foams have been used as packaging materials, flotation materials and structural furniture components. One important use of rigid polyurethane foams is as insulating material. Rigid foams may be shaped into slabs or sheets of varying thicknesses and placed between walls and in roofs or in floors. Composites of metal-foam or wood-foam have been prepared by foaming the urethane material while in contact with the metal or wood. Such composites are useful as structural members for walls, floors and roofs. The rigid foams also may be formed into annular or contour shapes which are useful in insulating pipes and ducts. Rigid foams also can be directly applied to numerous substrates by spray foaming techniques. Spray foam applications are important particularly in such areas as warehouses, schools and offices to provide the desired insulation requirements for heating and cooling.

The catalysts which are utilized in the formation of polyurethane foams may differ depending on whether flexible or rigid urethane foams are produced. A wide variety of catalysts has been suggested for preparing flexible polyurethane foams, and these include metal as well as tertiary amine catalysts. See, for example, *Polyurethanes: Chemistry and Technology Part II*, Saunders and Frisch, Interscience Publishers 1964, pages 21-25 where the catalytic activity of various sodium, lead, iron, tin, copper, manganese, cadmium, etc. compounds, particularly salts, is discussed. The catalytic activity of typical nitrogen compounds also is reported. Studies of the activity of various catalysts for rigid foam systems are discussed in the same book at pages 217-219. Tertiary amines and tin compounds such as stannous octoate and dibutyl tin dilaurate are reported to be useful.

The use of various zinc salts as catalysts in various combinations has been described in the patent literature. For example, in British Pat. No. 980,139, zinc salts of aliphatic and aromatic carboxylic acids are described as useful in conjunction with known catalysts in the manufacture of foamed polyurethanes from polymers containing secondary hydroxyl end groups even though the zinc carboxylates themselves reportedly have little or no catalytic activity. U.S. Pat. No. 3,347,804 describes the preparation of polyurethane foams using a catalyst combination of tin, lead and zinc salts, particularly the carboxylates.

U.S. Pat. No. 3,884,849 describes low density, flexible and semi-flexible polyurethane foams which contain a small amount of solid chlorine-containing polymeric resin, zinc oxide and a zinc salt of an organic monocarboxylic acid. This zinc salt is added to the formulation prior to foaming and is added in addition to the normal catalysts. The zinc salt reduces or prevents discoloration of the urethane foam. Non-yellowing polyurethanes also are described in U.S. Pat. No. 3,580,873. In the procedure described in this patent, an isocyanate-terminated prepolymer is reacted with a mixture of monoethanolamine and triethanolamine in the presence of a catalytic amount of a metal drier compound such as calcium-, zinc-, or lead naphthenate or octoate.

Low-smoke generating polyurethane foams having incorporated therein a flame retardant and smoke inhibiting amount of a composition which comprises a halogen-containing organic compound and a metal salt of a polyfunctional aromatic carboxylic acid are described in U.S. Pat. No. 4,053,439. Zinc and lithium salts of aromatic carboxylic acids are included in the description.

Other patents which describe the use of various zinc salts of organic acids as catalysts for polyurethane formation include U.S. Pat. Nos. 3,751,392, 3,476,933, and German Offenlegungsschrift 2,435,217.

The use of alkali metal salts including lithium salts of organic acids as catalyst for polyurethane formation also has been described in the patent literature. Examples of patents include U.S. Pat. Nos. 2,894,919, 3,041,295, 3,108,975, 3,634,345, 3,769,245, 3,940,517 and 4,107,069. In U.S. Pat. No. 3,634,345, alkali metal salts of aromatic o-hydroxy carboxylic acids are described as being useful, either alone or in combination with other catalysts normally employed in isocyanate chemistry. U.S. Pat. No. 3,940,517 suggests catalytic combinations of alkali metal salts and other materials as long as the additional materials do not adversely affect the catalytic function of the composition. A catalytic composition comprising a tertiary amino phenol and potassium-2-ethyl hexoate is reported to give especially desirable results.

The above-described references represent a sampling of the suggestions which have been made of catalysts, particularly lithium and zinc catalysts, useful in the formation of polyurethane foams.

Lithium salts have not been widely accepted as catalyts because the lithium salts generally exhibit a severe threshold effect (high activity). It is difficult to obtain an acceptable foam profile with lithium salts. Zinc salts, however, often are not active enough to work in many foams, but when zinc salts are effective as catalysts in foam formation, the foam profile is good.

SUMMARY OF THE INVENTION

An improvement in the preparation of rigid polyurethane foams having good foam profiles is described. More particularly, the invention relates to rigid polyurethane foams which are formed from a foamable mixture consisting essentially of
  (a) an organic polyisocyanate,
  (b) an organic polyol,
  (c) a blowing agent, and
  (d) a catalyst consisting of a mixture of lithium and zinc salts of aliphatic or alicyclic organic monocarboxylic acids or mixtures.

It has been discovered that the use of a mixture of lithium and zinc salts overcomes the difficulties of using lithium alone and results in improved foam profiles.

DESCRIPTION OF THE PREFERRED EMBODIMENTS

It has now been found that a variety of polyurethane foam formulations can be converted to rigid foams with good foam profiles utilizing as the catalyst, a combination of a lithium salt and a zinc salt of aliphatic or alicyclic organic monocarboxylic acids or mixtures of such acids. Compared to conventional amine catalysts, the catalyst mixture of the invention shows superior catalytic activity in a wide range of rigid foam systems. The improved reaction times are obtained with no significant deleterious effects on the physical properties of the foam. In general, substitution of the catalyst mixture of the invention for the more toxic and malodorous amine catalysts in many rigid foam systems results in comparable cream times and reduced rise, set and tack-free times.

The lithium and zinc salts which are used as catalysts in the formulation of the rigid polyurethane compositions of the invention can be the normal or basic salts of one or more aliphatic or alicyclic organic monocarboxylic acids. The monocarboxylic acids preferably are aliphatic or alicyclic monocarboxylic acids having from about 6 to 20 carbon atoms. These metal salts can be prepared from a single monocarboxylic acid or a mixture of monocarboxylic acids. Examples of monocarboxylic acids that can be used to prepare the lithium and zinc salts useful in the invention include hexanoic acid, heptanoic acid, 2-ethyl-hexanoic acid, neodecanoic acid, stearic acid, oleic acid, naphthenic acid, etc.

Some specific examples of the zinc salts useful in the invention include zinc palmitate, zinc octoate, zinc oleate, zinc neodecanoate and zinc napththenate. Some examples of lithium salts include lithium octoate, lithium neodecanoate, lithium naphthenate, lithium stearate, etc.

As mentioned above, the metal salts may be either normal salts or basic salts. The basic salts have a stoichiometric excess of the metal relative to the acid as compared with neutral or normal metal salts of the acid. For example, solutions of normal zinc salts of monocarboxylic acids such as neodecanoic acid contain about 8% zinc whereas a solution of a basic zinc neodecanoate contains up to about 22% or more zinc. The normal and basic metal salts have been described in the prior art and are available commercially such as from Mooney Chemicals, Inc., Cleveland, Ohio. Zinc and lithium neodecanoates are available under the trademark "TEN-CEM;" zinc salts prepared from a blend of synthetic domestic acids are available under the trade designation "CEM-ALL;" zinc salts of 2-ethylhexanoic acid are available under the designation "HEX-CEM"; and zinc and lithium naphthenates are available under the trademark "NAP-ALL".

The amount of the metal salts used as catalyst for preparing the rigid foams of the invention may vary over a wide range although an amount of metal salts providing up to about 5% of total metal based on the weight of polyol and more preferably to about 3% of total metal generally will be effective. In a preferred embodiment the amount of total metal will range between about 0.01 to 1% and more preferably from about 0.02 to about 0.2%, based on the weight of the polyol.

The weight ratio of the lithium salt to zinc salt may vary over a wide range such as from 5:95 to 95:5 although the ratio selected will depend on a number of factors including the lithium and zinc content of the salts being used as catalyst. The ratio weight of lithium to zinc in the catalyst can be as high as 1:200 although the ratio generally will be in the range of from 1:2 to 1:25.

The lithium and zinc salts may be added separately to the foamable mixture or as a preformed mixture in a coupler, generally polar solvents, to reduce gel formation. The amount of coupler may vary over a wide range and generally will be present in an amount up to 70%. Examples of couplers which may be used include alkoxy alkanols (such as glycol ethers), β-diketones, alcohols and amines although the alkoxy alkanols are preferred. Examples of the preferred alkoxy alkanols which are commercially available include diethylene glycol monoethyl ether available from Union Carbide under the trade designation Carbitol, and 2-ethoxy ethanol (Cellosolve). An example of a β-diketone is 2,4-pentanedione.

The rigid polyurethane foams of this invention can be virtually any rigid foam formed by reacting an organic polyisocyanate with an organic polyol in the presence of a blowing agent and the catalyst. The organic polyols which are useful in the preparation of the rigid polyurethanes of the invention preferably are tetrafunctional polyether polyols and polyether polyols of higher functionality which can be prepared by the reaction of an alkylene oxide such as ethylene oxide, propylene oxide or butylene oxide with a polyol having 4 or more available hydroxyl groups. Typical tetrafunctional and higher functional polyether polyols are prepared by the oxyalkylation of polyols such as the following: pentaerythritol, sucrose, 2,2,6,6-tetrakis (hydroxymethyl) cyclohexanol, glucose, sorbitol, mannitol, degraded starches, degraded cellulose, diglycerol, alpha-methyl glucoside and the like. When such polyether polyols are utilized in the rigid polyurethane foams of this invention, they should have a hydroxyl number in excess of about 200 and preferably in excess of about 250, with the best results ordinarily being achieved from those polyether polyols having hydroxyl numbers in excess of about 300.

In addition to the aliphatic polyols and the polyether polyols, polyester resins containing hydroxyl groups may be utilized to prepare useful rigid polyurethane foams. Suitable polyester resins may be prepared by reacting an excess of polyol with a polycarboxylic acid, especially dicarboxylic acids. Typical polyols include: ethylene glycol, propylene glycol, butylene glycol, glycerol, trimethylolpropane, trimethylolethane, 1,2,6-hexanetriol, pentaerythritol, diethylene glycol, dipropylene glycol and the like. Typical carboxylic acids include: adipic acid, succinic acid, azaleic acid, phthalic acid, isophthalic acid, terephthalic acid, chlorendic acid and tetrabromophthalic acid. Long chain dimer acids may be used to form useful polyols by esterification with polyols, especially diols such as ethylene glycol and the like. For the purposes of this invention, useful polyesters should have a minimum hydroxyl number of about 200, and preferably above about 250, with the best results being obtained from those polyesters having hydroxyl numbers in excess of about 300.

Another useful class of polyols which can be employed are the trialkanolamines which, by reaction with alkylene oxides, form adducts of suitable molecular weight, and the alkylene oxide adducts thereof. Illustrative of the lower molecular weight trialkanolamines include triethanolamine, triisopropanolamine and tributanolamine. The alkylene oxide adducts which can be employed are preferably those wherein the oxyalkylene moieties thereof have from 2 to 4 carbon atoms.

Alkylene oxide adducts of mono- and polyamines and also ammonia can be used as polyols. These may be termed aminic polyols. The mono- and polyamines are preferably reacted with alkylene oxides which have 2 to 4 carbon atoms; for example, ethylene oxide, 1,2-epoxypropane, the epoxybutanes, and mixtures thereof.

Mono- and polyamines suitable for reaction with alkylene oxides include, among others, methylamine, ethylamine, isopropylamine, butylamine, benzylamine, aniline, the toluidines, napthylamines, 1,3-butanediamine, 1,3-propanediamine, 1,4-butanediamine, 1,2-, 1,3-, 1,4-, 1,5-, and 1,6-hexanediamine, phenylenediamines, toluenediamine, naphthalenediamines and the like. Among the compounds of the above groups which are of particular interest are, among others, N,N,N', N'-tetrakis (2-hydroxypropyl) ethylenediamine; N,N,N',N'-tetrakis (2-hydroxypropyl) diethylenetriamine; phenyldiisopropanolamine and higher alkylene oxide adducts of aniline, and the like. Others which deserve particular mention are the alkylene oxide adducts of aniline or substituted aniline/formaldehyde condensation products.

Another material which may be present in the foams of this invention is castor oil and its derivatives. Also useful are the oxyalkylation products of polyaminepolyamide compounds as obtained by the reaction of dicarboxylic acids with polyamines.

The organic polyisocyanates which can be reacted with organic polyols to form rigid polyurethane foams include aliphatic, alkylaromatic and aromatic polyisocyanates. Typical organic polyisocyanates include aromatic polyisocyanates such as 2,4- and 2,6-toluene diisocyanate, 2,2'-, 2,4'-, 4,4'-diphenylmethane-diisocyanate, triphenylmethane-triisocyanate, biphenyl-diisocyanate, m- or p-phenylene-diisocyanate and 1,5-napthalenediisocyanate and aliphatic polyisocyanates such as isophorone-diisocyanate, 1,4-tetramethylene diisocyanate and hexamethylene diisocyanate. Preferred are the toluene diisocyanates and mixtures of 2,2'-, 2,4'-, and 4,4'-diphenylmethane diisocyanate and polyphenyl-polymethylene-polyisocyanates. The polyisocyanates may be used individually or as mixtures.

Good results are obtained when polyisocyanates having a functionality greater than 2.0 are utilized. Exemplary polyisocyanates include the following: crude diphenylmethane-4,4'-diisocyanate, commonly referred to as crude MDI having a functionality of about 2.5 to 2.6; crude toluene diisocyanate, commonly referred to as crude TDI, containing about 85 percent TDI and about 15 percent polymeric isocyanate and having a functionality of about 2.1; and polymethylene polyphenyl isocyanate, referred to as PAPI, having an isocyanate functionality greater than 2.4.

Polyurethane foams are prepared by reacting approximately one equivalent of an organic polyol with one equivalent of an organic polyisocyanate. It is frequently desirable to include small amounts of suitable surfactants and blowing agents.

The relative amount of organic isocyanate utilized in polyurethane foam formulations is susceptible to variation over a substantial range. Usually the isocyanate component is employed in an amount which provides approximately one reactive isocyanate group for each reactive hydrogen of the other compound, which is conventionally a polyol. However, some of the organic polyisocyanates tend to evaporate and it may be desirable to compensate for this loss. A range of about one-half equivalent to about two equivalents of organic polyisocyanate per equivalent of polyol component in the final material is ordinarily used, but smaller or larger amounts can be utilized with good results.

To impart a foamed or cellular structure to the blended polyol-polyisocyanate mixture, a suitable blowing agent is added or produced in situ. The liquid but relatively volatile halocarbons, such as the following halocarbons containing 1, 2 or even up to 4 carbon atoms, are especially desirable for the purpose. These include the following:

$CCl_3F, CCl_2F_2, C_2Cl_2F_4, CClF_3, CHCl_2F$ and $CHClF_2$

The halocarbons having one and two carbon atoms are preferred, and of these, methylene chloride, trichloromonofluoromethane and dichlorodifluoromethane are particularly useful in commercial preparations. These are added as liquids in quantities of about 10 percent or less to about 30 percent or more, by weight of the total resin to the blended polyol-polyisocyanate mixtures, or to one or more components thereof, and are substantially volatilized in the liquid mixture to effect cellulation. Subsequently, the mixture cures to a hardened cellular state.

Although the halocarbons are especially desirable as blowing agents when exceptional insulative properties are desired, other blowing agents such as water, carbon dioxide and low boiling hydrocarbons can be used in this invention.

In order to obtain relatively uniform distribution of the various components of the liquid system and to achieve proper cellulation, an emulsifier and/or surfactant may be incorporated into the mixture. These materials are physical in their effect and are not always necessary, especially if denser foams are desired.

Examples of surfactants which may be used include the so-called Pluronics, which have been described as being condensates of ethylene oxide with a hydrophobic base formed by condensing propylene oxide with propylene glycol. These are of a molecular weight in a range of about 2000 to about 8000 and are generally agreed to have the structure:

$$HO(C_2H_4O)_n(C_3H_6O)_n(C_2H_4O)_nH$$

wherein each n is independently an integer equal to at least one.

Another class of surfactants comprises the so-called Tetronics, which are formed by the addition of propylene oxide to ethylene diamine, followed by the addition of ethylene oxide. These compounds have been ascribed the structure:

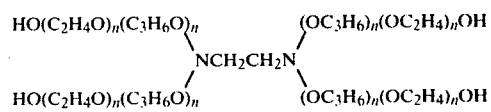

wherein each n also is independently an integer equal to at least one.

Another valuable calss of surfactants comprises the so-called Tweens, which are described as the mono- and polyesters of higher fatty acids, represented by lauric acid, palmitic acid, stearic acid and oleic acid, and polyoxyethylene sorbitan.

Another type of surfactant which has been found to be very effective in maintaining the cell structure in the foaming and curing of polyurethane resins comprises soluble, liquid derivatives of the silicones. A variety of silicone surfactants is available commercially such as from Dow Corning.

The surfactants may be employed in amounts within a range of about 0.1 to about 3 percent by weight based upon the organic polyisocyanate content. In relatively dense foams, for example, those having a density of about 5 or 6 pounds per cubic foot, the surfactants may be omitted entirely.

Flame retardant compositions can be added to rigid foam formulations if desired. The principal types of flame retardants are non-reactive solids and liquids, and many of these are known in the art. Antimony trioxide, halogenated organo-phosphorous compounds, halogenated paraffins, halogenated polyolefins, halogenated biphenyls, halogenated bisphenols, halogenated cyclopentadienes, and dicyclopentadienes are examples of flame retardant compositions for polyurethanes which have been described in the prior art. Amounts up to about 6 percent by weight of the foam reactant mixture have been found to be useful.

Specific examples of the various commercially available materials utilized in the preparation of the rigid polyurethane foams of the invention are described in Tables I and IA.

Examples of lithium-zinc mixtures useful in the invention are listed in Table II. As mentioned above, the lithium and zinc salts alternatively can be incorporated separately into the foamable mixture, and in such instances the coupler is unnecessary.

TABLE I

Commercial Materials

| Designation | Description | Equivalent Wt. | Source |
|---|---|---|---|
| POLYOLS | | | |
| Pluracol Pep 450 | Poly(oxypropylene) derivative of pentaerythritol | 100.7 | BASF Wyandotte |
| Pluracol Pep 550 | Poly(oxypropylene) derivative of pentaerythritol | 126.4 | BASF Wyandotte |
| Pluracol Pep 650 | Poly(oxypropylene) derivative of pentaerythritol | 146.9 | BASF Wyandotte |
| Niax Polyol BE-375 | Aromatic polyol | 150.8 | Union Carbide |
| Niax Polyol BDE-400 | Sucrose-amine polyol | 138.2 | Union Carbide |
| Niax Polyol LS-490 | Non-alkaline, Sorbitol-based | 113.6 | Union Carbide |
| Voranol 370 | Poly(oxypropylene) derivative of sucrose-glycerine | 151.6 | Dow Chemical |
| Voranol 490 | Poly(oxypropylene) derivative of sucrose-glycerine | 117.1 | Dow Chemical |
| ISOCYANATE | | | |
| Mondur MR | p,p'-diphenylmethane diisocyanate, functionality of 2.5–2.6 | 133.3 | Mobay Chemical Co. |

TABLE IA

Commercial Materials

| Designation | Description | Source |
|---|---|---|
| CATALYSTS | | |
| Dabco R-8020 | Blend of 1,4-Diazabicyclo (2,2,2) octane (20%) in dimethylethanolamine (80%) | Air Products & Chemical Co. |
| OTHER MATERIALS | | |
| DC 193 Surfactant | Silicone | Dow Corning |
| Freon 11-B | Trichlorofluoromethane | E.I. duPont deNemours |

TABLE II

| | Examples of Li:Zn Catalysts Example (parts by weight) | | | | | |
|---|---|---|---|---|---|---|
| Components | 1 | 2 | 3 | 4 | 5 | 6 |
| Li neodecanoate (2% Li)[1] | 7 | 1 | 8 | 8 | — | 7 |
| Zn octoate (22% Zn)[2] | 5 | 2 | 2 | — | 2 | — |
| Zn naphthenate (10% Zn)[3] | — | — | — | 4 | — | — |
| Li naphthenate (1.2% Li)[4] | — | — | — | — | 2 | — |
| Zn neodecanote (16% Zn)[5] | — | — | — | — | — | 6 |
| Carbitol[6] | 13 | 2 | 5 | 5 | 2 | 13 |

[1]Available from Mooney Chemicals under trade designation 2% Lithium Ten-Cem
[2]Available from Mooney Chemicals under trade designation 22% Zinc Hex-Cem
[3]Available from Mooney Chemicals under trade designation 10% Zinc Nap-All
[4]Available from Mooney Chemicals under trade designation 1.2% Lithium Nap-All
[5]Available from Mooney Chemicals under trade designation 16% Zinc Ten-Cem
[6]Monoethyl ether of diethylene glycol available from Union Carbide The preparation of rigid polyurethane foams is summarized in the following tables. Table III summarizes the various rigid foam systems used in the various examples which are summarized in Tables IV and IV(a). The control examples in the tables utilize the commercially available and widely used catalyst Dabco R-8020 for reference and comparison purposes. The rigid foams are prepared by the following general procedure.

The desired amount of isocyanate is weighed in a polyethylene beaker. The polyol also is weighed in a beaker and the other additives added to the polyol. The carboxylate catalyst is dissolved in the halocarbon blowing agent and then added to the polyol. The isocyanate and polyol components are blended and mixed with a high speed stirrer for 20 seconds. The mixture is poured into a cake box, and the cream time, rise time and tack-free time are recorded. After the exotherm ceases, the foam is placed into an oven at about 100° for 24 hours of post curing. The foam is then cooled and conditioned at room temperature for 6 to 7 days before it is cut with a band saw into the desired sizes for testing.

The effectiveness of a particular catalyst is determined by measuring (1) cream time, (2) the time required for the mixed foam components to rise (rise time) and (3) the time required for the foam to become non-sticky (tack-free time). In the experiments below, the time of mixing all ingredients is taken as zero time. The rise time is determined by measuring the time (in seconds) required for the foam to reach its final height. The tack-free time is taken to be the time (in seconds) required for the foam to become non-sticky when contacted with a paper towel.

The results reported in Tables IV and IV(a) indicate generally that the mixtures of lithium and zinc salts show improved catalytic activity in a wide range of rigid foam systems. Substitution of the metal salt mixture for the amine catalyst results generally in comparable cream times and reduced rise and tack-free time, and in some examples, the improvement is obtained with a lesser amount of the mixed metal catalyst.

TABLE III

| Formulation | FOAM FROMULATIONS[1] | | | | | | | |
|---|---|---|---|---|---|---|---|---|
|  | A | B | C | D | E | F | G | H |
| Pluracol Pep 450 | 100 | — | — | — | — | — | — | — |
| Pluracol Pep 550 | — | 100 | — | — | — | — | — | — |
| Pluracol Pep 650 | — | — | 100 | — | — | — | — | — |
| Niax BE-375 | — | — | — | 100 | — | — | — | — |
| Niax BDE-400 | — | — | — | — | 100 | — | — | — |
| Niax LS-490 | — | — | — | — | — | 100 | — | — |
| Voranol 370 | — | — | — | — | — | — | 100 | — |
| Voranol 490 | — | — | — | — | — | — | — | 100 |
| Mondur MR | 139.0 | 110.8 | 95.3 | 92.8 | 101.3 | 123.2 | 92.5 | 119.5 |
| DC-193 | 1.5 | 1.5 | 1.5 | 1.5 | 1.4 | 1.4 | 1.5 | 1.5 |
| Freon 11B | 30 | 35 | 36 | 38 | 35 | 32 | 38 | 35 |
| Li:Zn catalyst | | | | variable | | | | |
| Dabco R-8020 | | | | variable | | | | |

[1]Parts by weight

TABLE IV

| Catalyst[2] | FOAM EXAMPLES[1] | | | | | | | | | |
|---|---|---|---|---|---|---|---|---|---|---|
|  | A-1 | A-2 | A-3 | B-1 | B-2 | C-1 | C-2 | D-1 | D-2 | E-1 | E-2 |
| Dabco R-8020 | 1.7 | — | — | 1.5 | — | 1.7 | — | 1.5 | — | 1.0 | — |
| Example 1 | — | 1.7 | — | — | 1.5 | — | 1.0 | — | 1.0 | — | 0.5 |
| Example 2 | — | — | 1.4 | — | — | — | — | — | — | — | — |
| Example 3 | — | — | — | — | — | — | — | — | — | — | — |
| Cream Time (sec) | 63 | 87 | 48 | 57 | 54 | 48 | 54 | 33 | 33 | 54 | 42 |
| Rise Time (sec) | 123 | 128 | 105 | 147 | 120 | 180 | 134 | 135 | 97 | 144 | 102 |
| Tack Free Time (sec) | 129 | 138 | 108 | 231 | 162 | 300 | 228 | 210 | 126 | 189 | 171 |

[1]Prefix letter (e.g. A-1) refers to respective foam formulation in Table III
[2]In all examples, number refers to percent of catalyst based on weight of polyol TABLE IV(a)

| Catalyst[2] | FOAM EXAMPLES[1] | | | | | | |
|---|---|---|---|---|---|---|---|
|  | F-1 | F-2 | F-3 | G-1 | G-2 | H-1 | H-2 |
| Dabco R-8020 | 1.5 | — | — | 1.7 | — | 1.7 | — |
| Example 1 | — | 1.7 | — | — | 1.4 | — | 0.8 |
| Example 2 | — | — | — | — | — | — | — |
| Example 3 | — | — | 1.5 | — | — | — | — |
| Cream Time (sec) | 63 | 102 | 78 | 60 | 34 | 48 | 39 |
| Rise Time (sec) | 168 | 276 | 165 | 186 | 105 | 123 | 81 |
| Tack Free Time (sec) | 225 | 372 | 192 | 258 | 202 | 168 | 114 |

I claim:

1. In a method for producing rigid polyurethane foam by the reaction of a foamable mixture comprising
   (a) an organic polyisocyanate,
   (b) an organic polyol,
   (c) a blowing agent, and
   (d) a catalyst
the improvement comprising incorporating as the catalyst into said mixture prior to foaming, an effective amount of a mixture of lithium and zinc salts of aliphatic or alicyclic organic monocarboxylic acids or mixtures of acids.

2. The method of claim 1 wherein the catalyst consists essentially of lithium and zinc salts of aliphatic or alicyclic monocarboxylic acids having from about 6 to 20 carbon atoms.

3. The method of claim 1 wherein the weight ratio of lithium to zinc in the foamable mixture is in the range of from about 1:1 to about 1:25.

4. The method of claim 1 wherein the catalyst is present in an amount sufficient to provide a total metal content of from about 0.01 to about 1% by weight based on the weight of the organic polyol.

5. The method of claim 2 wherein the weight ratio of lithium to zinc salt in the catalyst mixture is in the range of from about 95:5 to about 5:95.

6. The method of claim 1 wherein the blowing agent is a halocarbon blowing agent.

7. In a method for producing rigid polyurethane foam by the reaction of the foamable mixture comprising
   (a) an organic polyisocyanate,
   (b) an organic polyol,
   (c) a halocarbon blowing agent, and
   (d) a catalyst,
the improvement comprising incorporating as the catalyst into said mixture prior to foaming, from about 0.01 to about 1% by weight based on the weight of the organic polyol of a mixture of lithium and zinc salts of aliphatic or alicyclic organic monocarboxylic acids having from about 6 to 20 carbon atoms, or mixtures of such acids and wherein the ratio of lithium to zinc in the foamable mixture is in the range of from about 1:1 to about 1:25.

8. The method of claim 7 wherein a preformed mixture of lithium and zinc salts in a polar solvent is added to the foamable mixture.

9. The method of claim 8 wherein the polar solvent is an alkoxy alkanol.

* * * * *